Sept. 5, 1961 J. F. REUTHER ET AL 2,999,201
ELECTRIC CONTROL CIRCUIT
Filed July 9, 1957 2 Sheets-Sheet 1

INVENTORS
John F. Reuther and
James D. Finley.
BY
F. E. Browder
ATTORNEY

2,999,201
ELECTRIC CONTROL CIRCUIT
John F. Reuther, Penn Township, Allegheny County, and James D. Finley, Monroeville, Pa., assignors to Westinghouse Electric Corporation, East Pittsburgh, Pa., a corporation of Pennsylvania
Filed July 9, 1957, Ser. No. 670,815
10 Claims. (Cl. 322—28)

This invention relates to electric circuits and more particularly to voltage sensing circuits.

Regulator systems employed to maintain an alternating current voltage at a predetermined value generally have used dry-type rectifiers in a full-wave bridge circuit to rectify the alternating current voltage and obtain a direct current measure of the alternating current voltage. It has been found that the dry-type rectifiers used in conventional sensing circuits introduce an appreciable forward voltage drop which varies with the environmental temperature. The forward voltage drop which varies with temperature introduces an undesirable source of temperature error into the regulator system. It is desirable that a sensing circuit be provided which has as low a forward voltage drop as possible. Any variation in a reduced forward voltage drop would then introduce a smaller percent error into the regulator system.

It is an object of this invention to provide a new and improved voltage sensing circuit.

Another object of this invention is to provide a new and improved voltage sensing circuit for a regulator system in which the error introduced by said sensing circuit due to changes in environmental temperatures is reduced.

A more specific object of this invention is to provide an electric circuit for applying a direct current measure of an alternating current voltage to a load in which transistors are connected as rectifiers to reduce the forward voltage drop in said electric circuit and to reduce the error introduced by changes in the forward voltage drop in said electric circuit due to changes in the environmental temperature.

Other objects of the invention will, in part, be obvious and will, in part, appear hereinafter.

Figure 1:
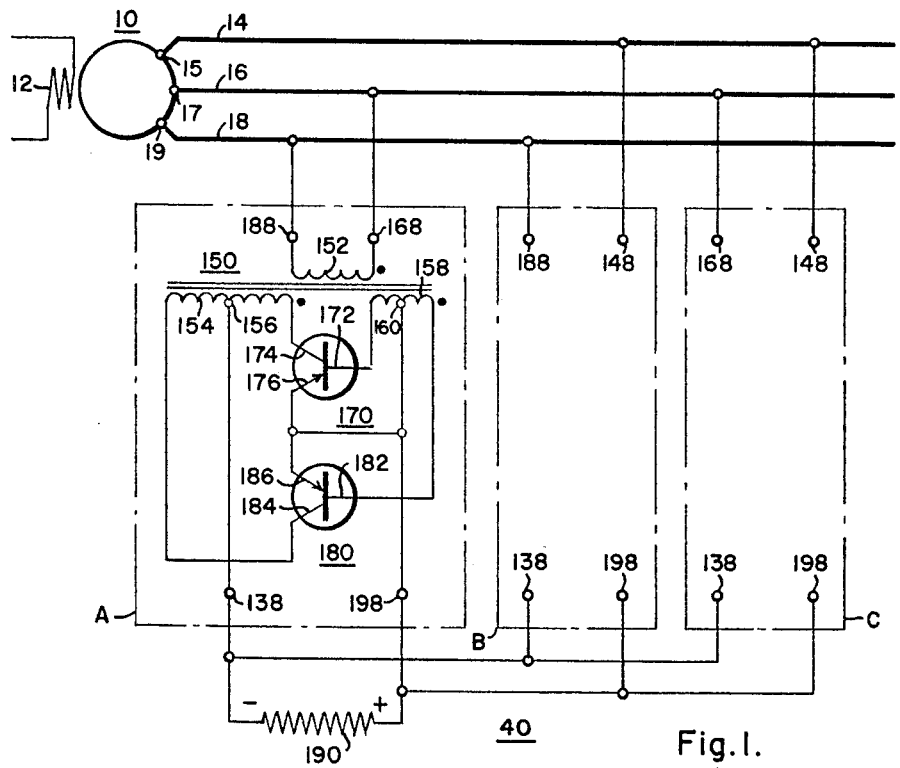
Figure 2:
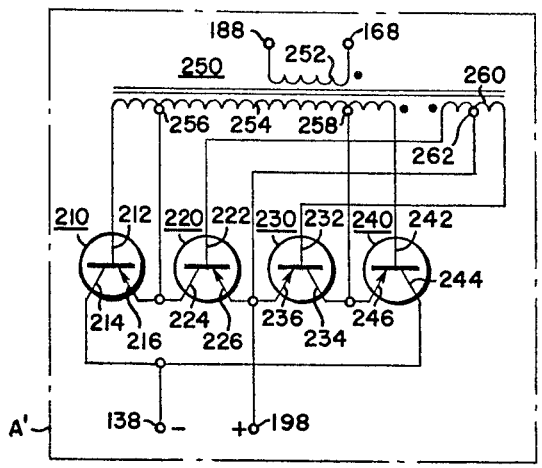

For a fuller understanding of the nature and objects of the invention, reference should be had to the following detailed description taken in connection with the accompanying drawing, in which:

FIGURE 1 diagrammatically illustrates one embodiment of this invention;

FIG. 2 illustrates a second embodiment of this invention; and

Figure 3:
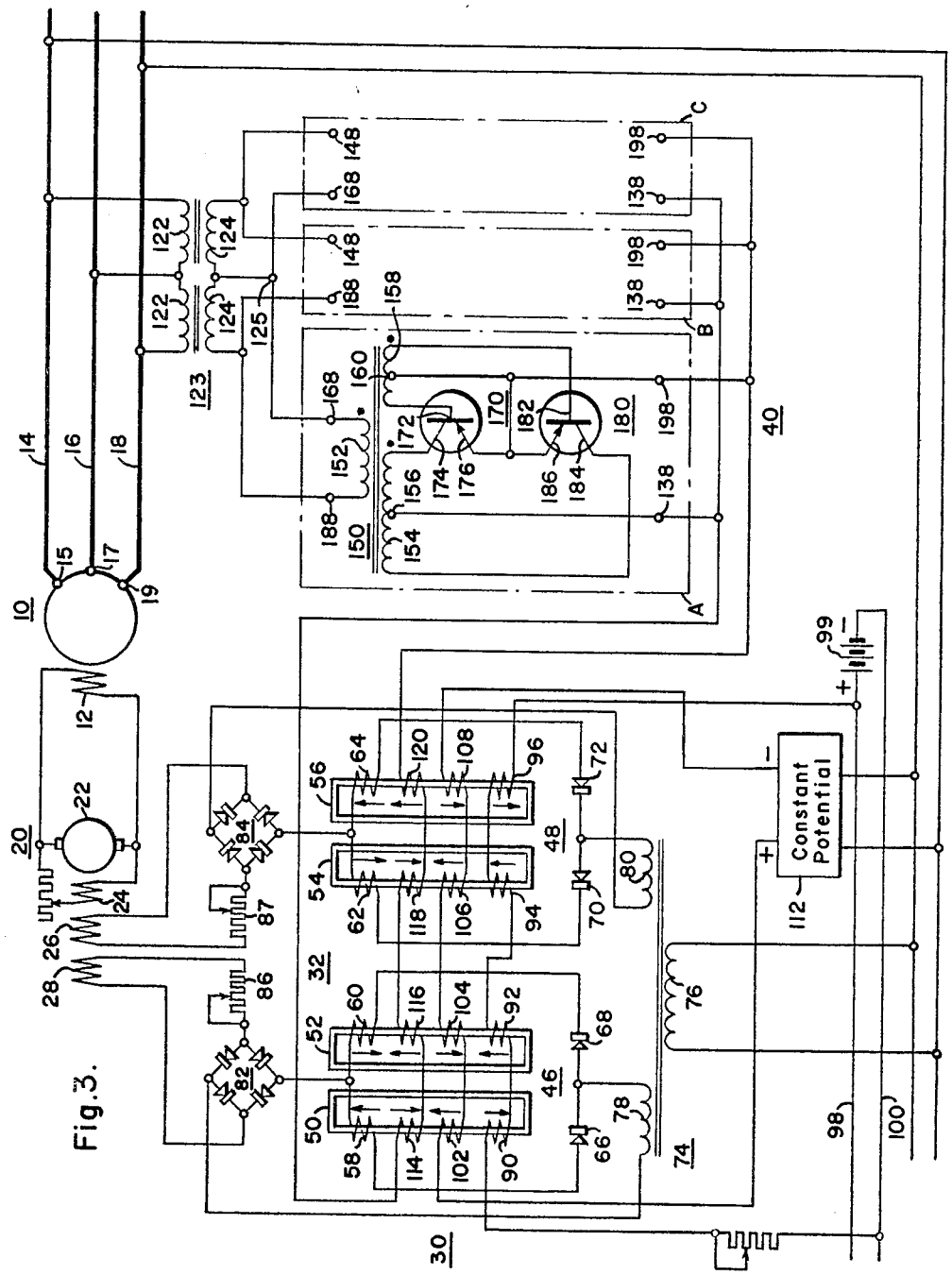

FIG. 3 diagrammatically illustrates a regulator system which incorporates this invention in its sensing circuit.

Referring now to the drawing and FIG. 1 in particular, there is illustrated a dynamo-electric machine, specifically a synchronous generator 10, having an excitation field winding 12, disposed to supply electric power through the output terminals 15, 17 and 19 to the three phase electrical system at the line conductors 14, 16 and 18. In general, the three-phase sensing circuit 40 including the single phase sensing circuits A, B and C is connected between the line conductors 14, 16 and 18 and the load 190.

The single phase sensing circuit A as illustrated comprises the transformer 150 and the P-N-P junction type transistors 170 and 180. The transformer 150 includes a primary winding 152 and two secondary windings 154 and 158, each of said secondary windings having a midtap at 156 and 160, respectively. The primary winding 152 is connected to the input terminals 168 and 188 of the sensing circuit A which in turn are connected to the line conductors 16 and 18, respectively. The transistor 170 includes a base 172, an emitter 176 and a collector 174. The transistor 180 includes a base 182, an emitter 186 and a collector 184. In general, the transistors 170 and 180 are connected to the secondary windings 154 and 158 in a full wave connection for rectifying the alternating current voltage which is applied at the input terminals 188 and 168 of the sensing circuit A. In particular, the collectors 174 and 184 of the transistors 170 and 180, respectively, are connected to the ends of the secondary winding 154. The bases 172 and 182 of the transistors 170 and 180, respectively, are connected to the ends of the secondary winding 158. The emitters 176 and 186 of the transistors 170 and 180, respectively, are both connected to the midtap 160 of the secondary winding 158 and also through the output terminal 198 to one side of the load resistance 190. The midtap 156 of the secondary winding 154 is connected through the output terminel 138 to the other side of the load resistance 190. In similar fashion, the sensing circuit B, which comprises the same equipment and circuit as the sensing circuit A, is connected through its input terminals 188 and 148 to the line conductors 18 and 14, respectively. The output terminals 138 and 198 of the sensing circuit B are connected in parallel with the output terminals of the sensing circuit A across the load resistance 190. In similar fashion, the sensing circuit C is connected through its input terminals 168 and 148 to the line conductors 16 and 14, respectively. The output terminals 138 and 198 of the sensing circuit C are also connected in parallel with the output terminals of the sensing circuit A across the load resistance 190.

In general, the three-phase sensing circuit 40 operates to apply across the load resistance 190 a direct current output voltage which is a measure of the average value of the three single phase alternating current voltages which are applied at the input terminals of the single phase sensing circuits A, B and C. The operation of the single phase sensing circuit A will now be considered in detail. It will be assumed during the first half cycle of the alternating current voltage applied at the input terminals 188 and 168 of the sensing circuit A that the voltage at the terminal 168 is positive with respect to the voltage at the terminal 188. The voltage at the base 182 will then be positive with respect to the voltages at the collector 184 and the emitter 186 of the transistor 180 and the transistor 180 will therefore be substantially non-conducting. On the other hand, the voltage at the base 172 of the transistor 170 will be negative with respect to the voltage at both the emitter 176 and the collector 174 and the resistance between the emitter 176 and the collector 174 will be at a negligible value. The voltage between the midtap 156 and the right end of the secondary winding 154 will then cause saturation current to flow into the collector 174 and out of the emitter 176 of the transistor 170 through the output terminal 198 and the load resistance 190 back through the output terminal 138 to the midtap 156 of the secondary winding 154. The value of the current which will flow under the assumed condition will be limited only by the resistance of the load 190. Since the resistance between the collector 174 and the emitter 176 of the transistor 170 is reduced to a negligible value, the forward voltage drop through the transistor 170 will be very low and almost all of the voltage will appear across the load resistance 190. During the next half cycle of the alternating current voltage applied at the input terminals 188 and 168, the voltage at the terminal 168 will be negative with respect to the voltage at the terminal 188 and the polarity of the voltage across both of the secondary windings 154 and 158 will also be reversed. The voltage at the base 172 will then be positive with respect to the voltages at both the collector 174 and the emitter 176 of the transistor 170 and the transistor 170 will be substantially non-conducting during this half cycle. The voltage at the base 182 will be negative with respect to the voltages at both the collector 184 and the emitter 186 and the resistance between the collector 184 and the emitter 186 will be at a negligible value. The voltage between the left end and the midtap 156 of the secondary winding 154 will then cause saturation current to flow from the left end of the winding into the collector 184 and out of the emitter 186 through the output terminal 198 to the load resistance 190 and back through the output terminal 138 to the midtap 156. As in the first half cycle, the resistance between the emitter 186 and the collector 184 of the transistor 180 will be at a negligible value and consequently the forward voltage drop in the transistor 180 will have a very low value and almost all of the voltage applied to the transistor 180 will appear across the load resistance 190.

It will be noted that the transistors 170 and 180 are connected to the secondary windings 154 and 158 of the sensing circuit A so that the output current which flows in the transistors 170 and 180 flows in a direction which is opposite to the direction of the normal emitter current of the transistors 170 and 180. This connection of the transistors 170 and 180 is known as an inverted connection since during the half cycle when each of the transistors 170 and 180 conducts, current flows out of the emitters of the P-N-P junction type transistors shown in the illustrated embodiment. It will be readily understood that N-P-N junction type transistors could be used in the sensing circuit A and connected to the secondary windings in inverted connections. It has been found that transistors connected in inverted connections as shown have a lower forward voltage drop than transistors connected in the normal connection in which the output current flows in the direction of the emitter arrows.

Referring to FIG. 2, there is illustrated a single phase sensing circuit A' which may be substituted for the single phase sensing circuits A, B and C shown in FIG. 1. In general, the single phase sensing circuit A' is similar to the sensing circuit A except that twice as many transistors are employed in a full-wave bridge connection. In particular, the sensing circuit A' as illustrated comprises a transformer 250 and four P-N-P junction type transistors 210, 220, 230 and 240. The transformer 250 comprises a primary winding 252 connected to the input terminals 188 and 168 of the sensing circuit A' and a first secondary winding 254 having two symmetrically placed taps 256 and 258 and a secondary winding 260 having a midtap 262. The transistors 210, 220, 230 and 240 each includes a base, a collector and an emitter. The bases 212 and 242 of the transistors 210 and 240, respectively, are connected to the ends of the secondary winding 254. The bases 222 and 232 of the transistors 220 and 230 respectively are connected to the ends of the secondary winding 260. The collectors 214 and 244 of the transistors 210 and 240 respectively are both connected to the output terminal 138. The collectors 224 and 234 of the transistors 220 and 230 respectively are connected to the taps 256 and 258, respectively, of the secondary winding 254. The emitters 216 and 246 of the transistors 210 and 240 respectively, are also connected to the taps 256 and 258 respectively, of the secondary winding 254. The emitters 226 and 236 of the transistors 220 and 230, respectively, are both connected to the midtap 262 of the secondary winding 260 and also to the output terminal 198.

In general, the sensing circuit A' operates in similar fashion to the sensing circuit A except that during each half cycle of the alternating current voltage applied to the input terminals 188 and 168 of the sensing circuit A' two of the four transistors 210, 220, 230 and 240 are always conducting. During the first half cycle of the alternating current voltage applied at the input terminals 188 and 168 of the sensing circuit A', it will be assumed that the voltage at the terminal 168 is positive with respect to the voltage at the terminal 188. The voltages at the bases 242 and 222 will then be positive with respect to the voltages at the collectors 244 and 224 and at the emitters 246 and 226 of the transistors 240 and 220, respectively. The transistors 220 and 240 will therefore be substantially non-conducting. On the other hand, during the first half cycle the voltages at the bases 232 and 212 will be negative with respect to the voltages at the collectors 234 and 214 and at the emitters 236 and 216 of the transistors 230 and 210, respectively. The resistance between the collector 234 and the emitter 236 of the transistor 230 and the resistance between the collector 214 and the emitter 216 of the transistor 210 will therefore each be at a negligible value. The voltage between the taps 256 and 258 of the secondary winding 254 which will be positive at the tap 258 with respect to the tap 256 will cause saturation current to flow from tap 258 into the collector 234 and out of the emitter 236 of the transistor 230 and out of the output terminal 198 through whatever load is connected to the output terminals 198 and 138, back through the output terminal 138 into the collector 214 and out of the emitter 216 of the transistor 210 and back to the tap 256. The value of the current, which flows under the assumed condition will be limited only by the resistance of whatever load is connected to the output terminals 198 and 138. In similar fashion during the following half cycle when the polarity of the voltages across the secondary windings 254 and 260 reverses, the transistors 210 and 230 will be substantially non-conducting and the output current will be carried by the transistors 240 and 220, respectively.

It will be noted in the operation of the sensing circuit A' that the direction of flow of the output current in the transistors 210 to 240 is opposite to the direction of the normal emitter current of the transistors 210 to 240. The transistors 210 to 240 are, therefore, connected to the secondary windings 254 and 260 in inverted connections with a similar reduction in the forward voltage drop as in the sensing circuit A. Since in the sensing circuit A' two transistors are always conducting in series, the forward voltage drop in the transistors is twice that of the sensing circuit A. The sensing circuit A', however, is designed for twice the input voltage that the sensing circuit A can handle. The percentage error introduced by the sensing circuit A' is, therefore, the same as the sensing circuit A and the sensing circuit A' is designed to carry twice as much power as the sensing circuit A.

Referring to FIG. 3, there is illustrated a dynamo-electric machine, specifically a synchronous generator 10, having a field winding 12. As in FIG. 1, the synchronous generator 10 is disposed to supply power to the line conductors 14, 16 and 18 through the output terminals 15, 17 and 19, respectively. In order to obtain an excitation voltage across the excitation field winding 12 of relatively large magnitude, an exciter 20 is provided. The exciter 20 comprises an armature 22 which supplies current to the field winding 12 of the synchronous generator 10 and a self-excited field winding 24, which is connected in shunt with the armature 22, and buck and boost excitation field windings 26 and 28, respectively, the purpose of which will be explained hereinafter. In order to maintain the output voltage of the synchronous generator at substantially a predetermined value, a regulator loop 30 comprising a push-pull magnetic amplifier 32 and the sensing circuit 40 is interconnected between the output of the synchronous generator 10 and the buck and boost field windings 26 and 28, respectively, of the exciter 20.

The description and operation of the sensing circuit 40 will be as previously explained for FIG. 1. In this case, however, a transformer 123 comprising primary windings 122 and secondary windings 124 is interposed between the line conductors 14, 16 and 18 and the input terminals 148, 168 and 188 of the sensing circuits A, B and C which comprise the three-phase sensing circuit 40. The primary windings 122 are connected to the line conductors 14, 16 and 18 and are responsive to the alternating current voltage at the output terminals 15, 17 and 19 of the synchronous generator 10. The input terminals 138 and 168 of the sensing circuit A are connected at the left end of the secondary windings 124 and at the terminal 125 between the secondary windings 124. The input terminals 188 and 148 of the sensing circuit B are connected at the left and right ends, respectively, of the secondary windings 124. The input terminals 168 and 148 of the sensing circuit C are connected at the right end of the secondary windings 124 and at the terminal 125 between the secondary windings 124. As previously explained, the direct current voltage which appears at the output terminals 138 and 198 of the three phase sensing circuit 40 is a measure of the average of the three single phase alternating current voltages applied at the input terminals of the sensing circuits A, B and C.

As illustrated, the push-pull magnetic amplifier 32 is of standard construction and comprises two main sections 46 and 48. The section 46 comprises two magnetic core members 50 and 52, and the section 48 comprises two magnetic core members 54 and 56. In this instance, the load windings 58, 60, 62, and 64 are disposed in inductive relationship with the magnetic core members 50, 52, 54 and 56, respectively. As is customary, self-saturation for the magnetic amplifier 32 is obtained by connecting in series circuit relationship with the load windings 58, 60, 62 and 64, self-saturating rectifiers 66, 68, 70 and 72, respectively.

In order to form a doubler circuit of the section 46, the series circuit including the load winding 58 and the self-saturating rectifier 66 is connected in parallel circuit relationship with the series circuit including the load winding 60 and the self-saturating rectifier 68. In like manner, in order to form a doubler circuit of the section 48, the series circuit including the load winding 62 and the self-saturating rectifier 70 is connected in parallel circuit relationship with the series circuit including the load winding 64 and the self-saturating rectifier 72.

Energy for the load windings 58, 60, 62 and 64, of the magnetic amplifier 32, is received from a transformer 74 having a primary winding 76, which in this instance is responsive to the output voltage of the synchronous generator 10, and secondary winding sections 78 and 80. As illustrated, a full-wave dry-type load rectifier 82 is interconnected with the hereinbefore described parallel circuit of the section 46, and with the secondary winding section 78, of the transformer 74, in order to produce a direct-current output for the section 46. In like manner, a full-wave dry-type load rectifier 84 is interconnected with the hereinbefore described parallel circuit of the section 48, and with the secondary winding section 80 of the transformer 74, in order to obtain a direct-current output for the section 48.

In this instance, the boost field winding 28 of the exciter 20 is responsive to the output of the load rectifier 82 and the buck field winding 26 of the exciter 20 is responsive to the output of the load rectifier 84. In operation, the buck field winding 26 opposes the boost field winding 28. In order to provide means for changing the gain in the regulator loop 30, the variable resistors 86 and 87 are connected in series circuit relationship with the boost field winding 28 and with the buck field winding 26, respectively.

For the purpose of biasing each of the sections 46 and 48 of the magnetic amplifier 32 to approximately half its output, the bias windings 90, 92, 94 and 96 are disposed in inductive relationship with the magnetic core members 50, 52, 54 and 56, respectively. In particular, the bias winding 90, 92, 94 and 96 are connected in series circuit relationship with one another, the series circuit being connected to the conductors 98 and 100 which have applied thereto a substantially constant direct-current voltage from the direct current source 99. In operation, the current flow through the bias windings 90, 92, 94 and 96 produces magnetomotive force with respect to their respective magnetic core members that opposes the magnetomotive force produced by the current flow through the load windings 58, 60, 62 and 64, respectively.

In order to obtain a reference point from which to operate from in each of the sections 46 and 48 of the magnetic amplifier 32, the reference windings 102, 104, 106 and 108 are disposed in inductive relationship with the magnetic core members 50, 52, 54 and 56, respectively. The reference windings 102, 104, 106 and 108 are so disposed on their respective magnetic core members 50, 52, 54 and 56 that the current flow through the reference windings 102 and 104 produces a magnetomotive force that opposes the magnetomotive force produced by the respective bias windings 90 and 92, and that the current flow through the reference windings 106 and 108 produces a magnetomotive force that is additive to the magnetomotive force produced by the respective bias windings 94 and 96. As illustrated, the reference windings 102, 104, 106 and 108 are connected in series circuit relationship with one another, the series circuit being connected to the output terminals of a constant potential device 112 which produces at its output terminals a substantially constant direct current voltage irrespective of the magnitude of the output voltage of the synchronous generator 10, to which the constant potential device 112 is responsive. This is done in order that the current flow through the reference windings 102, 104, 106 and 108 remain substantially constant.

The control windings 114, 116, 118 and 120 are disposed in inductive relationship with the magnetic core members 50, 52, 54 and 56, respectively. The control windings 114, 116, 118 and 120 are connected in series circuit relationship with one another, the series circuit being connected to the output terminals 138 and 198 of the sensing circuit 40. The control windings 114, 116, 118 and 120 are disposed on the respective magnetic core members 50, 52, 54 and 56 so that when current flows therethrough, a magnetomotive force is produced in the respective magnetic core members that opposes the magnetomotive force produced by the current flow through the respective reference windings 102, 104, 106 and 108. The output voltage of the synchronous generator 10 is at its regulated value when the magnetomotive forces produced by the current flow through the control windings 114, 116, 118 and 120 are substantially equal to the respective magnetomotive forces produced by the current flow through the reference windings 102, 104, 106 and 108.

In the operation of the regulator loop 30, when the output voltage of the synchronous generator 10 increases to a value above its regulated value, the voltage applied to the input terminals of the sensing circuit 40 also increases. The direct current output of the sensing circuit 40 increases and the current flow through the control windings 114, 116, 118 and 120 then increases to thereby decrease the output current from the section 46 of the magnetic amplifier 32 and increase the output current from the section 48 of the magnetic amplifier 32. Such an action increases the current flow through the buck field winding 36 of the exciter 20 and decreases the current flow through the boost field winding 28 to thereby decrease the output voltage of the exciter 20. A decrease in the output voltage of the exciter 20 decreases the magnitude of the voltage across the excitation field winding 12 of the synchronous generator 10 to thereby return the output voltage of the synchronous generator 10 to its regulated value. The direction of the magnetomotive forces in the windings of the magnetic amplifier 32 are shown for the condition when the output voltage of the generator is above its regulated value.

On the other hand, a decrease in the output voltage of the synchronous generator 10 to a value below its regulated value decreases the alternating current voltage applied to the input terminals of the sensing circuit 40 and decreases the direct current output voltage at the output terminals 138 and 198 of the sensing circuit 40.

A decrease in the voltage at the terminals 138 and 198 decreases the magnitude of the current flow through the control windings 114, 116, 118 and 120. A decrease in the current flow through control windings 114, 116, 118 and 120 unbalances the push-pull magnetic amplifier 32 in such a direction that the output current from the section 46 of the magnetic amplifier 32 increases and the output current from the section 48 decreases. Such an action increases the magnitude of the current flow through the boost field winding 28 of the exciter 20 and decreases the magnitude of the current flow through the buck field winding 26. This, in turn, increases the magnitude of the output voltage of the exciter 20 as well as the magnitude of the voltage across the excitation field winding 12 of the synchronous generator 10 to thereby return the magnitude of the output voltage of the synchronous generator 10 to its regulated value.

It is to be understood that the sensing circuit of this invention may be employed either with single phase or polyphase alternating current circuits. It is also to be understood that the transistors shown in FIG. 1 or FIG. 2 may either be P-N-P junction type or the N-P-N junction type transistors assuming that the proper polarities in the sensing circuit are observed. It will be readily appreciated that the sensing circuits of this invention may be employed in connection with metering or relaying systems as well as with regulator systems.

The apparatus embodying the teachings of this invention has several advantages. The forward voltage drop in the sensing circuits of this invention will be considerably less than the forward voltage drop of conventional dry-type rectifiers employed as part of the sensing circuits of many conventional regulator systems. The errors introduced by the variations with changes in the environmental temperature of the forward voltage drop of a sensing circuit embodying this invention will, therefore, be much less than the error introduced by dry-type rectifiers in a conventional sensing circuit employed at part of a regulator system. A regulator system which includes a sensing circuit embodying this invention will therefore have improved accuracy.

Since numerous changes may be made in the above-described apparatus and circuit and different embodiments of the invention may be made without departing from the spirit thereof, it is intended that all the matter contained in the foregoing description and shown in the accompanying drawing shall be interpreted as illustrative and not in a limiting sense.

We claim as our invention:

1. An electric circuit for applying a direct current measure of an alternating current voltage to a load, including unidirectional current output terminals, alternating current input terminals, a plurality of transistors, each of said transistors having an emitter and a collector, transformer means including a primary winding and two secondary windings, said primary winding being connected to said input terminals, said transistors being connected to said secondary windings in a full-wave connection for rectifying said alternating current voltage, the emitters and collectors of said transistors being connected in inverted connections with the unidirectional output current flowing in each of said transistors in a direction opposite to that of the normal emitter current of said transistors, and means for connecting said transistors and said secondary windings to said output terminals.

2. An electric circuit for applying a direct current measure of an alternating current voltage to a load, including unidirectional current output terminals, alternating current input terminals, a plurality of transistors, each of said transistors having an emitter and a collector, transformer means including a primary winding and two secondary windings, said primary winding being connected to said input terminals, said transistors being connected to said secondary windings in a full-wave bridge connection for rectifying said alternating current voltage, the emitters and collectors of said transistors being connected in inverted connections with the unidirectional output current flowing in each of said transistors in a direction opposite to that of the normal emitter current of said transistors, and means for connecting said transistors and said secondary windings to said output terminals.

3. An electric circuit for applying a direct current measure of the average value of the three phase voltages of a three-phase alternating current circuit to a load, including: three transformers each having a primary winding and first and second secondary windings, each of said secondary windings having a tap substantially at its midpoint, each primary winding being connected to one phase of said alternating current circuit, three pairs of transistors, each of said transistors having a base, a emitter and a collector, the bases of each pair of said transistors being connected to the ends of the first secondary winding of one of said transformers, the collectors of each pair of said transistors being connected to the ends of the second secondary winding of the associated transformer, the emitters of each pair of said transistors being connected to said tap of the first secondary winding of the associated transformer and also to one side of said load, and the tap of the second secondary winding of each transformer being connected to the other side of said load.

4. An electric circuit for applying a direct current measure of the average value of the three phase voltages of a three-phase alternating current circuit to a load, including: three transformers each having a primary winding and first and second secondary windings, each primary winding being connected to one phase of said alternating current circuit, each of said first secondary windings having first and second substantially symmetrical taps, each of said second secondary windings having a tap substantially at its midpoint, first and second pairs of transistors connected in circuit relation with each of said transformers, each of said transistors having a base, an emitter and a collector, the bases of said first pair of transistors associated with each transformer being connected to the ends of the first secondary winding, the bases of said second pair of transistors associated with each transformer being connected to the ends of the second secondary winding, the collectors of said first pair of transistors being connected to one side of said load, the emitters of said first pair of transistors being connected to said first and second taps of the first secondary winding of the associated transformer, and the emitters of said second pair of transistors being connected to the tap of the second secondary winding of the associated transformer and also to the other side of said load.

5. In a regulator system for a dynamo-electric machine having output terminals and an excitation field winding, a transformer having a primary winding and two secondary windings, said primary winding being connected across said output terminals, a plurality of transistors, each of said transistors having an emitter and a collector, said transistors being connected in a full-wave connection to said secondary windings for rectifying the voltage across said secondary windings and providing a direct current output, the direct current output of said transistors being a measure of the voltage across the output terminals of said dynamo-electric machine, means for comparing said direct current output with a reference voltage, and means for controlling the field winding of said dynamo-electric machine in accordance with the larger of the direct current output and the reference voltage.

6. In a regulator system for a dynamo-electric machine having output terminals and an excitation field winding, a transformer having a primary winding and two secondary windings, said primary winding being connected across said output terminals, a plurality of transistors, each of said transistors having an emitter and a collector, said transistors being connected in a full-wave connection to said secondary windings for rectifying the voltage across said secondary windings and providing a direct current output, the emitters and collectors of said transistors being connected to said secondary windings in inverted connections for providing said direct current output flowing in said transistors in a direction opposite to that of the normal emitter current of said transistors, the direct current output of said transistors being a measure of the voltage across the output terminals of said dynamo-electric machine, means for comparing said direct current output with a reference voltage, and means for controlling the field winding of said dynamo-electric machine in accordance with the larger of the direct current output and the reference voltage.

7. In a regulator system for a dynamo-electric machine having output terminals and an excitation field winding, a transformer having a primary winding and two secondary windings, said primary winding being connected across said output terminals, a plurality of transistors, each of said transistors having an emitter and a collector, said transistors being connected in a full-wave bridge connection to said secondary windings for rectifying the voltage across said secondary windings and providing a direct current output, the direct current output of said transistors being a measure of the voltage across the output terminals of said dynamo-electric machine, means for comparing said direct current output with a reference voltage, and means for controlling the field winding of said dynamo-electric machine in accordance with the larger of the direct current output and the reference voltage.

8. In a regulator system for a dynamo-electric machine having output terminals and an excitation field winding, a transformer having a primary winding and two secondary windings, said primary winding being connected across said output terminals, a plurality of transistors, each of said transistors having an emitter and a collector, said transistors being connected in a full-wave bridge connection to said secondary windings for rectifying the voltage across said secondary windings and providing a direct current output, the emitters and collectors of said transistors being connected to said secondary windings in inverted connections for providing said direct current output flowing in said transistors in a direction opposite to that of the normal emitter current of said transistors, the direct current output of said transistors being a measure of the voltage across the output terminals of said dynamo-electric machine, means for comparing said direct current output with a reference voltage, and means for controlling the field winding of said dynamo-electric machine in accordance with the larger of the direct current output and the reference voltage.

9. In a regulator system for a dynamo-electric machine having output terminals and an excitation field winding, a transformer having a primary winding and two secondary windings, said primary winding being connected across said output terminals, a plurality of transistors each having an emitter and a collector, said transistors being connected in a full-wave connection to said secondary windings for rectifying the voltage across said secondary windings and providing a direct current output, the direct current output of said transistors being a measure of the voltage across the output terminals of said dynamo-electric machine, and a magnetic amplifier for comparing said direct current output with a reference voltage, said magnetic amplifier being connected between said transistors and said field winding to control the current applied tto said field winding in accordance with the larger of said direct current output and said reference voltage and to maintain the output voltage of said machine at substantially a predetermined value.

10. In a regulator system for a dynamo-electric machine having output terminals and an excitation field winding, a transformer having a primary winding and two secondary windings, said primary winding being connected across said output terminals, a plurality of transistors each having an emitter and a collector, said transistors being connected in a full-wave connection to said secondary windings for rectifying the voltage across said secondary windings and providing a direct current output, the emitters and the collectors of said transistors being connected in inverted connections with the unidirectional output current flowing in said transistors in a direction opposite to that of the normal emitter current of said transistors, the direct current output of said transistors being a measure of the voltage across the output terminals of said dynamo-electric machine, and a magnetic amplifier for comparing said direct current output with a reference voltage, said magnetic amplifier being connected between said transistors and said field winding to control the current applied to said field winding in accordance with the larger of said direct current output and said reference voltage and to maintain the output voltage of said machine at substantially a predetermined value.

References Cited in the file of this patent

UNITED STATES PATENTS

| | | |
|---|---|---|
| 2,371,056 | Livingston | Mar. 6, 1945 |
| 2,504,878 | Reilly | Apr. 18, 1950 |
| 2,693,568 | Chase | Nov. 2, 1954 |
| 2,740,086 | Evans et al. | Mar. 27, 1956 |
| 2,763,731 | Pfann | Sept. 18, 1956 |
| 2,806,963 | Woll | Sept. 17, 1957 |